(12) United States Patent
Sethi et al.

(10) Patent No.: US 11,431,389 B1
(45) Date of Patent: Aug. 30, 2022

(54) SYSTEM AND METHOD FOR ENABLING BEAMFORMING IN WIRELESS NETWORKS

(71) Applicant: NXP USA, Inc., Austin, TX (US)

(72) Inventors: Ankit Sethi, Pune (IN); Sayak Roy, Kolkata (IN); Sudhir Srinivasa, Los Gatos, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 17/305,597

(22) Filed: Jul. 10, 2021

(51) Int. Cl.
*H04L 1/02* (2006.01)
*H04B 7/0456* (2017.01)

(52) U.S. Cl.
CPC .................................. *H04B 7/0456* (2013.01)

(58) Field of Classification Search
CPC .................................................. H04B 7/0456
USPC .......................................................... 375/267
See application file for complete search history.

(56) References Cited

U.S. PATENT DOCUMENTS

| | | | |
|---|---|---|---|
| 8,437,440 B1 * | 5/2013 | Zhang | H04W 84/12 375/366 |
| 8,948,283 B2 | 2/2015 | Zhang | |
| 9,363,122 B2 | 6/2016 | Park et al. | |
| 10,219,169 B1 * | 2/2019 | Schelstraete | H04B 7/0456 |
| 2012/0300874 A1 * | 11/2012 | Zhang | H04L 69/22 375/295 |
| 2016/0119933 A1 | 4/2016 | Merlin et al. | |
| 2018/0234135 A1 * | 8/2018 | Vermani | H04L 5/0044 |
| 2019/0146077 A1 * | 5/2019 | Kravets | H04B 17/391 455/67.11 |

FOREIGN PATENT DOCUMENTS

WO 2017041590 A1 3/2017

* cited by examiner

*Primary Examiner* — Helene E Tayong (57) ABSTRACT

A beamformer generates a null data packet (NDP) that includes various long training fields (LTFs). The beamformer generates the NDP based on a spatial mapping matrix that is a product of two matrices. One matrix has a number of rows equal to a number of antennas of the beamformer, and a number of columns equal to a number of LTFs in the NDP. Further, the other matrix has a number of rows and a number of columns equal to the number of LTFs in the NDP. The number of LTFs in the NDP is greater than a number of antennas of the beamformer. Further, the beamformer transmits the NDP to a beamformee to obtain channel state information associated with a channel between the beamformer and the beamformee, and enable beamforming therebetween.

18 Claims, 6 Drawing Sheets

SYSTEM AND METHOD FOR ENABLING BEAMFORMING IN WIRELESS NETWORKS

BACKGROUND

The present disclosure relates generally to wireless communication, and, more particularly, to a system and a method for enabling beamforming in wireless networks.

In wireless networks, wireless devices implement beamforming to improve quality (i.e., energy level) of wireless signals communicated therebetween. Examples of such wireless devices can include an access point (AP), a wireless client (e.g., a mobile device), or the like. A wireless device transmitting the wireless signals is referred to as a beamformer, and a wireless device receiving the wireless signals is referred to as a beamformee. When the beamformer is an AP, the beamformee can be a wireless client. Alternatively, when the beamformer is a wireless client, the beamformee can be an AP. The beamformer generates a steering matrix to enable the beamforming with the beamformee (i.e., to beamform the wireless signals to the beamformee). To generate the steering matrix, channel state information of a channel between the beamformer and the beamformee is required. To obtain the channel state information, the beamformer generates and transmits a null data packet (NDP) to the beamformee. The NDP includes various long training fields (LTFs) that assist the beamformee in estimating the channel state information.

Typically, a number of LTFs in the NDP is equal to a number of antennas of the beamformer. A signal-to-noise ratio associated with the beamformee is determined based on the number of LTFs in the NDP, and improves with an increase in the number of LTFs. Thus, to improve a beamforming performance of the beamformer, the beamformer generates the NDP having the number of LTFs greater than the number of antennas. In such a scenario, the NDP further has a status bit indicating that the number of LTFs in the NDP is greater than the number of antennas. The status bit is included in a high-efficiency signaling (HE-SIG) field of the NDP. Such a status bit is absent in the Institute of Electrical and Electronics Engineers (IEEE) 802.11 standard. Thus, utilization of the status bit limits the implementation of such a beamforming technique for the IEEE 802.11 standard. Therefore, there exists a need for a technical solution that solves the aforementioned problem of existing beamforming techniques.

SUMMARY

In an embodiment of the present disclosure, a beamformer is disclosed. The beamformer can include a plurality of antennas and a processing circuit that can be coupled with the plurality of antennas and a beamformee. The processing circuit can be configured to generate a null data packet (NDP). The NDP can include a plurality of long training fields (LTFs). A first count of the plurality of LTFs can be greater than a second count of the plurality of antennas. The NDP can be generated based on a spatial mapping matrix that is a product of first and second matrices. The first matrix can have a number of rows equal to the second count, and a number of columns equal to the first count. The second matrix can have a number of rows and a number of columns equal to the first count. The processing circuit can be further configured to transmit, using the plurality of antennas, the NDP to the beamformee to enable beamforming between the beamformer and the beamformee.

In another embodiment of the present disclosure, a beamforming method is disclosed. The beamforming method can include generating an NDP by a beamformer. The NDP can include a plurality of LTFs. A first count of the plurality of LTFs can be greater than a second count of a plurality of antennas of the beamformer. The NDP is generated based on a spatial mapping matrix that is a product of first and second matrices. The first matrix can have a number of rows equal to the second count, and a number of columns equal to the first count. The second matrix can have a number of rows and a number of columns equal to the first count. The beamforming method can further include transmitting the NDP by the beamformer to a beamformee using the plurality of antennas to enable beamforming therebetween.

In some embodiments, the first matrix can correspond to a first submatrix of a first orthogonal matrix. The first orthogonal matrix can have a number of rows and a number of columns equal to the first count. The second matrix can correspond to a second orthogonal matrix.

In some embodiments, the NDP can further include a signal field that can be indicative of a number of spatial time streams associated with the beamformer. The number of spatial time streams can be equal to the first count.

In some embodiments, the processing circuit can be further configured to generate a steering matrix associated with the beamformee based on a feedback matrix. The feedback matrix can be generated by the beamformee. Further, the feedback matrix can be indicative of channel state information associated with a channel between the beamformer and the beamformee. The processing circuit can be further configured to transmit, based on the steering matrix and using the plurality of antennas, a set of wireless signals to the beamformee, thereby enabling beamforming between the beamformer and the beamformee.

In some embodiments, the processing circuit can be further configured to receive a compressed feedback matrix from the beamformee, and process the compressed feedback matrix to regenerate the feedback matrix.

In some embodiments, the processing circuit can be further configured to receive the feedback matrix from the beamformee.

In some embodiments, the processing circuit can be further configured to generate an NDP announcement (NDPA) frame. The NDPA frame can include an index value that can be indicative of a number of columns to be included in the feedback matrix. Further, the index value can be equal to one of the first and second counts. The processing circuit can be further configured to transmit, using the plurality of antennas, the NDPA frame to the beamformee. The processing circuit transmits the NDPA frame to the beamformee prior to the transmission of the NDP to the beamformee.

In some embodiments, the first matrix can include second and third submatrices that can correspond to a first identity matrix and a null matrix, respectively. The first identity matrix can have a number of rows and a number of columns equal to the second count. The null matrix can have a number of rows equal to the second count, and a number of columns equal to a difference between the first and second counts.

In some embodiments, the steering matrix can correspond to a fourth submatrix of the feedback matrix. The fourth submatrix can have a number of rows and a number of columns equal to the second count.

In some embodiments, the first matrix can include fifth and sixth submatrices. The fifth submatrix can correspond to a product of a first phasor value and a second identity matrix. The second identity matrix can have a number of rows and a number of columns equal to the second count. Further, the sixth submatrix can correspond to a product of a second phasor value and a third identity matrix. The third identity matrix can have a number of rows and a number of columns equal to the second count.

In some embodiments, to generate the steering matrix, the processing circuit can be further configured to extract seventh and eighth submatrices from the feedback matrix such that a number of rows and a number of columns of each submatrix of the seventh and eighth submatrices is equal to the second count. The processing circuit can be further configured to generate a ninth submatrix based on the eighth submatrix and the first and second phasor values. The processing circuit can be further configured to combine the seventh and ninth submatrices to generate the steering matrix.

Various embodiments of the present disclosure disclose a beamformer that can include multiple antennas and a processing circuit. The processing circuit can generate an NDP that includes various LTFs. A number of LTFs in the NDP can be greater than a number of antennas of the beamformer. The NDP can be generated based on a spatial mapping matrix. The spatial mapping matrix can be a product of two matrices. One matrix can have a number of rows equal to the number of antennas of the beamformer, and a number of columns equal to the number of LTFs in the NDP. The other matrix can have a number of rows and a number of columns equal to the number of LTFs in the NDP. The processing circuit can transmit the NDP to a beamformee. The NDP is transmitted to the beamformee to obtain channel state information associated with a channel between the beamformer and the beamformee. The channel state information can be then utilized by the processing circuit to generate a steering matrix associated with the beamformee. Based on the steering matrix, the processing circuit can beamform (i.e., generate and transmit) various wireless signals to the beamformee, thereby enabling beamforming between the beamformer and the beamformee.

Thus, in a beamforming technique implemented by the beamformer of the present disclosure, the number of LTFs in the NDP is greater than the number of antennas of the beamformer. Further, a number of spatial time streams associated with the beamformer is equal to the number of LTFs as opposed to being equal to the number of antennas in a conventional beamforming technique. Based on the LTFs and the spatial time streams associated with the beamformer, the beamformee generates the feedback matrix. Thus, a need to transmit a status bit to the beamformee to indicate that the number of LTFs in the NDP is greater than the number of antennas of the beamformer, is eliminated. In other words, the beamforming technique of the present disclosure is implemented exclusively by utilizing the LTFs and the spatial time streams which are a part of the Institute of Electrical and Electronics Engineers (IEEE) 802.11 standard. Thus, the beamforming technique of the present disclosure can be implemented for the IEEE 802.11 standard.

BRIEF DESCRIPTION OF THE DRAWINGS

The following detailed description of the preferred embodiments of the present disclosure will be better understood when read in conjunction with the appended drawings. The present disclosure is illustrated by way of example, and not limited by the accompanying figures, in which like references indicate similar elements.

DETAILED DESCRIPTION

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Figure 1:
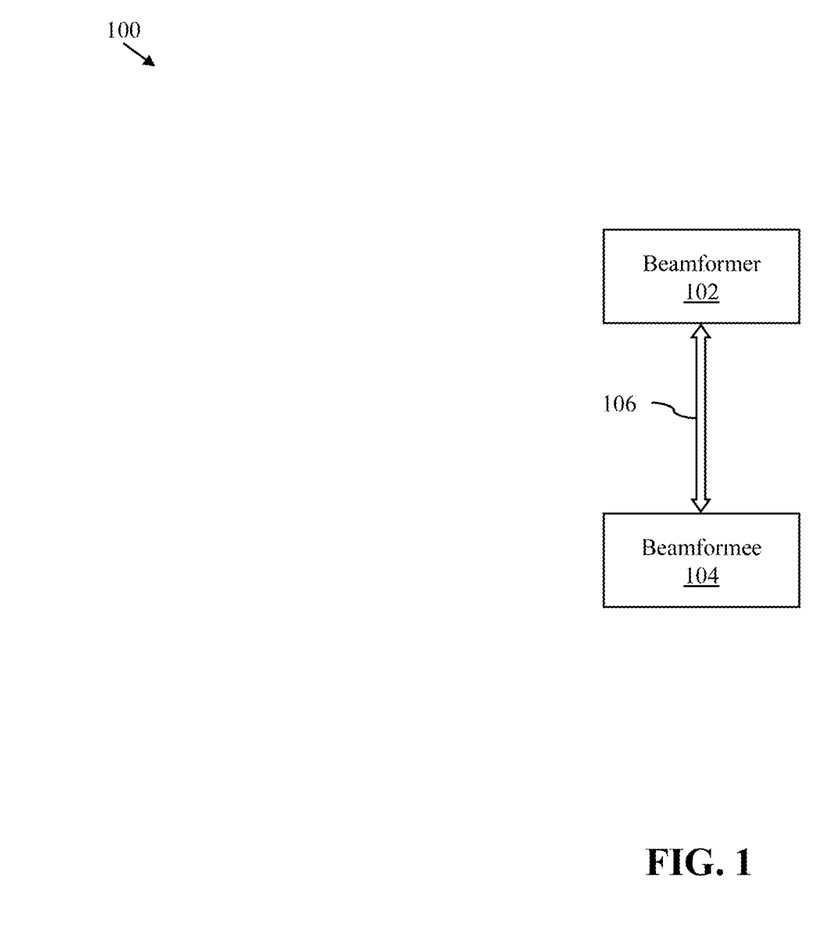
FIG. 1 illustrates a schematic block diagram of a wireless network in accordance with an embodiment of the present disclosure.

FIG. 1 illustrates a schematic block diagram of a wireless network 100 in accordance with an embodiment of the present disclosure. The wireless network 100 can include a beamformer 102 and a beamformee 104. The beamformer 102 corresponds to a wireless device that transmits various wireless signals in the wireless network 100, and the beamformee 104 corresponds to a wireless device that receives the wireless signals transmitted by the beamformer 102. In other words, beamforming is enabled between the beamformer 102 and the beamformee 104. The beamformer 102 can be coupled with the beamformee 104 by way of a channel 106. The wireless network 100 can correspond to a wireless local area network (WLAN), a multiple-input-multiple-output (MIMO) network, a worldwide interoperability for microwave access (WiMAX) network, a network that complies with the Institute of Electrical and Electronics Engineers (IEEE) 802.11 standard, a cellular network, or the like.

The beamformer 102 can be coupled with the beamformee 104. The beamformer 102 can be configured to generate and transmit a null data packet announcement (NDPA) frame (shown later in FIGS. 2 and 3) to the beamformee 104. The NDPA frame can include an index value (not shown) that is indicative of a number of columns to be included in a feedback matrix (shown later in FIGS. 2 and 3) transmitted by the beamformee 104 to the beamformer 102. The feedback matrix can be indicative of channel state information associated with the channel 106. The channel state information can correspond to a channel measurement of the channel 106 as observed by the beamformee 104. It will be apparent to a person skilled in the art that the NDPA frame can include various other values or fields required for establishing wireless communication between the beamformer 102 and the beamformee 104.

The beamformer 102 can be further configured to generate a null data packet (NDP) (shown later in FIGS. 2 and 3). The NDP can correspond to a packet that does not have a payload. Further, the NDP can facilitate beamforming between the beamformer 102 and the beamformee 104. The NDP can include a plurality of long training fields (LTFs) and a signal field. The LTFs can facilitate estimation of the channel state information associated with the channel 106. The signal field can be indicative of a number of spatial time streams associated with the beamformer 102. Each spatial time stream can carry a predefined number of data packets during beamforming with the beamformee 104. The number of spatial time streams can be equal to a first count of the plurality of LTFs. The first count can be greater than a number of antennas of the beamformer 102. The beamformer 102 can include a plurality of antennas (shown later in FIG. 4). Thus, the first count can be greater than a second count of the plurality of antennas. It will be apparent to a person skilled in the art that the NDP can include various other fields required for establishing wireless communication between the beamformer 102 and the beamformee 104.

The beamformer 102 can generate the NDP based on a spatial mapping matrix (not shown). The spatial mapping matrix can be indicative of a mapping between the spatial time streams associated with the beamformer 102 and the plurality of antennas of the beamformer 102. The spatial mapping matrix can be a product of first and second matrices (not shown). The first matrix can have a number of rows equal to the second count, and a number of columns equal to the first count. The first matrix can correspond to a first submatrix of a first orthogonal matrix (not shown). The first orthogonal matrix can have a number of rows and a number of columns equal to the first count. In other words, the first matrix can be extracted from the first orthogonal matrix. An orthogonal matrix corresponds to a matrix whose columns and rows are orthonormal vectors. Further, a product of the orthogonal matrix and a conjugate transpose of the orthogonal matrix is a scaled version of an identity matrix. Further, the second matrix can have a number of rows and a number of columns equal to the first count. The second matrix can correspond to a second orthogonal matrix (not shown). Thus, the spatial mapping matrix has a number of rows equal to the second count, and a number of columns equal to the first count. Further, the beamformer 102 can be configured to transmit the NDP to the beamformee 104 to obtain the channel state information associated with the channel 106 and enable beamforming therebetween.

In response to the NDP, the beamformer 102 can be configured to receive the feedback matrix from the beamformee 104. Based on the feedback matrix, the beamformer 102 can be further configured to generate a steering matrix (shown later in FIGS. 2 and 3) associated with the beamformee 104. The steering matrix facilitates beamforming between the beamformer 102 and the beamformee 104 in the wireless network 100. For example, the steering matrix associated with the beamformee 104 defines an arrangement of each antenna element of the plurality of antennas to select a spatial path for wireless signal transmission towards the beamformee 104. In other words, the steering matrix associated with the beamformee 104 defines an arrangement of each antenna element of the plurality of antennas to beamform various wireless signals to the beamformee 104. This can lead to a significant increase in a signal energy level, and in turn, in a signal-to-noise ratio (SNR) and a data rate associated with the wireless signal transmission between the beamformer 102 and the beamformee 104.

The beamformer 102 can be further configured to generate a set of wireless signals (shown later in FIGS. 2 and 3) for the beamformee 104. Based on the steering matrix associated with the beamformee 104, the beamformer 102 can be further configured to transmit the set of wireless signals to the beamformee 104, thereby enabling beamforming therebetween. Examples of the beamformer 102 can include an access point (AP), a wireless client (e.g., a mobile device), or the like. The beamformer 102 is explained in detail in conjunction with FIGS. 2-4, 5A, and 5B.

The beamformee 104 can include suitable circuitry that can be configured to execute one or more operations. For example, the beamformee 104 can be configured to receive the NDPA frame and the NDP from the beamformer 102 by way of the channel 106. Based on the received NDP and NDPA frame, the beamformee 104 can be further configured to generate the feedback matrix, and transmit the feedback matrix to the beamformer 102. The beamformee 104 generates the feedback matrix by analyzing the LTFs in the NDP. Further, the number of columns of the feedback matrix can be determined based on the index value in the NDPA frame. The feedback matrix generated by the beamformee 104 can be indicative of the channel state information associated with the channel 106. The beamformee 104 can be further configured to receive the set of wireless signals from the beamformer 102. The beamformee 104 is explained in detail in conjunction with FIGS. 2 and 3. Examples of the beamformee 104 can include an AP, a wireless client (e.g., a mobile device), or the like. When the beamformer 102 is an AP, the beamformee 104 can be a wireless client. Alternatively, when the beamformer 102 is a wireless client, the beamformee 104 can be an AP.

Although it is described that the beamformee 104 transmits the feedback matrix in response to the NDP, the scope of the present disclosure is not limited to it. In an alternate embodiment, the beamformee 104 can compress the feedback matrix and transmit the compressed feedback matrix (shown later in FIG. 3) to the beamformer 102. In such a scenario, the beamformer 102 can be further configured to receive the compressed feedback matrix from the beamformee 104, and process the compressed feedback matrix to regenerate the feedback matrix. The regenerated feedback matrix can be then utilized for generating the steering matrix associated with the beamformee 104.

It will be apparent to a person skilled in the art that the wireless network 100 is shown to include a single beamformee (i.e., the beamformee 104) to make the illustrations concise and clear and should not be considered as a limitation of the present disclosure. In various other embodiments, the wireless network 100 may include more than one beamformee, without deviating from the scope of the present disclosure. In such a scenario, the beamformer 102 can enable beamforming with each additional beamformee in a similar manner as described above.

Figure 2:
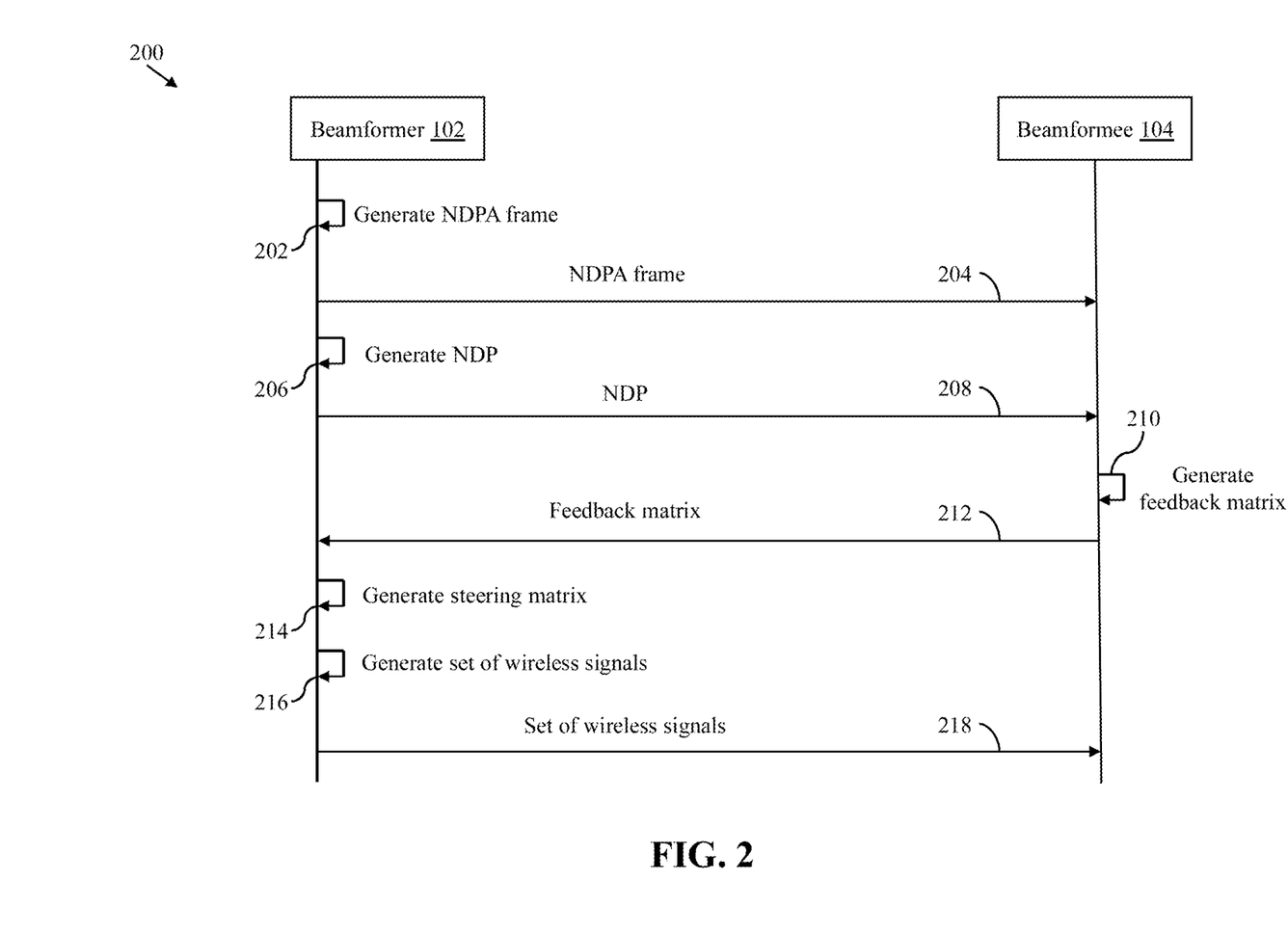
FIG. 2 is a sequence diagram that illustrates beamforming between a beamformer of the wireless network of FIG. 1 and a beamformee of the wireless network of FIG. 1 in accordance with an embodiment of the present disclosure.

FIG. 2 is a sequence diagram 200 that illustrates beamforming between the beamformer 102 and the beamformee 104 in accordance with an embodiment of the present disclosure. The beamformer 102 can generate the NDPA frame (as shown by arrow 202). The NDPA frame can include the index value that can be indicative of the number of columns to be included in the feedback matrix. The index value can be equal to one of the first and second counts. For the sake of ongoing discussion, it is assumed that the index value is equal to the first count. The beamformer 102 can then transmit the NDPA frame to the beamformee 104 (as shown by arrow 204).

The beamformer 102 can generate the NDP (as shown by arrow 206). The NDP can include the signal field and the plurality of LTFs. The signal field can be indicative of the number of spatial time streams associated with the beamformer 102. The number of spatial time streams can be equal to the first count. Further, the first count can be greater than the second count.

The beamformer 102 generates the NDP based on the spatial mapping matrix that is the product of the first and second matrices. The number of rows of the spatial mapping matrix can be equal to the second count, and the number of columns of the spatial mapping matrix can be equal to the first count. The beamformer 102 can then transmit the NDP to the beamformee 104 (as shown by arrow 208). The beamformer 102 transmits the NDP to the beamformee 104 to obtain the channel state information associated with the channel 106, and enable beamforming between the beamformer 102 and the beamformee 104.

The beamformee 104 can generate the feedback matrix based on the NDPA frame and the NDP received from the beamformer 102 (as shown by arrow 210). The feedback matrix can be indicative of the channel state information associated with the channel 106. The beamformee 104 can then transmit the feedback matrix to the beamformer 102 (as shown by arrow 212). Based on the received feedback matrix, the beamformer 102 can generate the steering matrix associated with the beamformee 104 (as shown by arrow 214). Further, the beamformer 102 can generate the set of wireless signals (as shown by arrow 216). The beamformer 102 can then transmit, based on the steering matrix, the set of wireless signals to the beamformee 104, thereby enabling beamforming between the beamformer 102 and the beamformee 104 (as shown by arrow 218).

In one exemplary embodiment of the present disclosure, the first matrix can include second and third submatrices (not shown). The second submatrix can correspond to a first identity matrix (not shown). The first identity matrix can have a number of rows and a number of columns equal to the second count. Further, the third submatrix can correspond to a first null matrix (not shown). The first null matrix can have a number of rows equal to the second count, and a number of columns equal to a difference between the first count and the second count. The first matrix is formed by appending the third submatrix to the second submatrix. The first matrix is illustrated below in equation (1):

$$M_{nTx,nLTF}=[I1_{nTx,nTx} N1_{nTx,(nLTF-nTx)}]_{nTx,nLTF} \quad (1)$$

where,
nTx is the second count,
nLTF is the first count,
$M_{nTx,nLTF}$ is the first matrix,
$I1_{nTx,nTx}$ is the first identity matrix, and
$N1_{nTx,nLTF}$ is the first null matrix.

The NDP received by the beamformee 104 at corresponding antennas (not shown) is illustrated below in equation (2):

$$Y_{nRx,nLTF} = \left(H_{nRx,nTx} * M_{nTx,nLTF} * \frac{1}{\sqrt{nTx}} * P_{nLTF,nLTF}\right) + N_{nRx,nLTF} \quad (2)$$

where,
nRx is a number of antennas of the beamformee 104,
$Y_{nRx,nLTF}$ is the NDP received by the beamformee 104,
$H_{nRx,nTx}$ is a channel matrix associated with the channel 106, $$\frac{1}{\sqrt{nTx}}$$

is a first normalization factor,
$P_{nLTF,nLTF}$ is the second matrix, and
$N_{nRx,nLTF}$ is indicative of noise at the beamformee 104.

The beamformee 104 can be further configured to read the signal field of the NDP to identify the number of spatial time streams associated with the beamformer 102. As the number of spatial time streams associated with the beamformer 102 is equal to the first count, the beamformee 104 can be further configured to implement a matrix multiplication (i.e., undo P) operation on the received NDP to obtain the channel state information as illustrated below in equation (3):

$$HR_{nRx,nLTF} = Y_{nRx,nLTF} * \frac{1}{nLTF} * (P_{nLTF,nLTF})^H \quad (3)$$

where,
$HR_{nRx,nLTF}$ is the channel state information obtained at the beamformee 104, $$\frac{1}{nLTF}$$

is a Second normalization factor, and
$(P_{nLTF,nLTF})^H$ is a conjugate transpose of the second matrix.

Based on equations (2) and (3), equation (4) can be obtained as shown below:

$$HR_{nRx,nLTF} = \quad (4)$$
$$\left(\left(H_{nRx,nTx} * M_{nTx,nLTF} * \frac{1}{\sqrt{nTx}} * P_{nLTF,nLTF}\right) + N_{nRx,nLTF}\right) *$$
$$\frac{1}{nLTF} * (P_{nLTF,nLTF})^H$$

It will be apparent to a person skilled in the art that the product of $P_{nLTF,nLTF}$ and $(P_{nLTF,nLTF})^H$ is equal to a scaled version of an identity matrix. For the sake of ongoing discussion, it is assumed that a scaling factor is 'nTx'. Thus, approximating the equation (4), equation (5) can be obtained as shown below:

$$HR_{nRx,nLTF} \equiv (H_{nRx,nTx} * M_{nTx,nLTF}) + N_{nRx,nLTF} * \quad (5)$$
$$\frac{\sqrt{nTx}}{nLTF} * (P_{nLTF,nLTF})^H$$

As the first count is greater than the second count, the SNR at the beamformee 104 improves. In an example, when the number of LTFs is twice the number of antennas (i.e., the first count is twice the second count), the SNR at the beamformee 104 improves by 3 decibels. The beamformee 104 can then be configured to execute a singular value decomposition operation of the channel state information of the equation (5) to obtain equation (6) as shown below:

$$(HR_{nRx,nLTF})^H * HR_{nRx,nLTF} = V1_{nLTF,nLTF} * (\Lambda 1)* \\ (V1_{nLTF,nLTF})^H \quad (6)$$

where,
$V1_{nLTF,nLTF}$ is the feedback matrix,
$(V1_{nLTF,nLTF})^H$ is a conjugate transpose of the feedback matrix, and (A1) is an eigen vector matrix of eigen values of the feedback matrix.

The beamformee 104 can then transmit the feedback matrix to the beamformer 102. As the first matrix $M_{nTx,nLTF}$ corresponds to $[I1_{nTx,nTx}\ N1_{nTx,(nLTF-nTx)}]_{nTx,nLTF}$, the feedback matrix can be as shown below in equation (7):

$$V1_{nLTF,nLTF} = \begin{bmatrix} V2_{nTx,nTx} & L1_{nLTF,(nLTF-nTx)} \\ N2_{(nLTF-nTx),nTx} & \end{bmatrix}_{nLTF,nLTF} \quad (7)$$

where,
$N2_{(nLTF-nTx),nTx}$ is a second null matrix (not shown) that has a number of rows equal to the difference between the first count and the second count, and a number of columns equal to the second count, and
$L1_{nLTF,(nLTF-nTx)}$ has columns orthogonal to $$\begin{bmatrix} V2_{nTx,nTx} \\ N2_{(nLTF-nTx),nTx} \end{bmatrix}_{nLTF,nTx}.$$

Hence, an eigen value of each eigen vector in $L1_{nLTF,(nLTF-nTx)}$ is 0. The beamformer 102 can then generate the steering matrix associated with the beamformee 104 by extracting, from the feedback matrix, a fourth submatrix (not shown) such that a number of rows and a number of columns of the fourth submatrix is equal to the second count. The fourth submatrix can thus correspond to $V2_{nTx,nTx}$.

The enabling of beamforming between the beamformer 102 and the beamformee 104 explained above is based on the assumption that the index value is equal to the first count. When the index value is equal to the second count, the beamformee 104 can be further configured to transmit the feedback matrix having the number of columns equal to the second count. For example, the beamformee 104 can transmit $$\begin{bmatrix} V2_{nTx,nTx} \\ N2_{(nLTF-nTx),nTx} \end{bmatrix}_{nLTF,nTx}$$

as the feedback matrix. This reduces a size of the feedback matrix while transmission over the channel 106.

In another exemplary embodiment of the present disclosure, the first matrix can include fifth and sixth submatrices (not shown). The fifth submatrix can correspond to a product of a first phasor value (not shown) and a second identity matrix (not shown). The second identity matrix can have a number of rows and a number of columns equal to the second count. Further, the sixth submatrix can correspond to a product of a second phasor value (not shown) and a third identity matrix (not shown). The third identity matrix can have a number of rows and a number of columns equal to the second count. The first matrix is formed by appending the sixth submatrix to the fifth submatrix. For the sake of ongoing discussion, it is assumed that the first count is twice the second count. The first matrix of such a scenario is illustrated below in equation (8):

$$M_{nTx,nLTF} = \frac{1}{\sqrt{2}} * [(e^{j\varphi 1} * I2_{nTx,nTx})\ (e^{j\varphi 2} * I3_{nTx,nTx})]_{nTx,nLTF} \quad (8)$$

where,
$1/\sqrt{2}$ is a third normalization factor,
$e^{j\varphi 1}$ is the first phasor value,
$e^{j\varphi 2}$ is the second phasor value,
$I2_{nTx,nTx}$ is the second identity matrix, and
$I3_{nTx,nTx}$ is the third identity matrix.

In such a scenario, the feedback matrix received by the beamformer 102 from the beamformee 104 can be as shown below in equation (9):

$$V1_{nLTF,nLTF} = \begin{bmatrix} V3_{nTx,nTx} & L2_{nLTF,(nLTF-nTx)} \\ (e^{j(\varphi 1-\varphi 2)} * V3_{nTx,nTx}) & \end{bmatrix}_{nLTF,nLTF} \quad (9)$$

The eigen value of each eigen vector in $L2_{nLTF,(nLTF-nTx)}$ is 0. The beamformer 102 can be thus further configured to extract seventh and eighth submatrices (not shown) from the feedback matrix. A number of rows and a number of columns of each submatrix of the seventh and eighth submatrices is equal to the second count. Based on the equation (9), the beamformer 102 extracts $V3_{nTx,nTx}$ (i.e., the seventh submatrix) and $(e^{j(\varphi 1-\varphi 2)} * V3_{nTx,nTx})$, i.e., the eighth submatrix, from the feedback matrix. The beamformer 102 can be further configured to generate a ninth submatrix (not shown) based on the eighth submatrix and the first and second phasor values, and combine the seventh and ninth submatrices to generate the steering matrix. The combining of the seventh and ninth submatrices can include addition of the seventh and ninth submatrices followed by division by '2'. The combining of the seventh and ninth submatrices averages out any quantization noise introduced in the feedback matrix, especially when the feedback matrix is compressed prior to transmitting to the beamformer 102.

The enabling of beamforming between the beamformer 102 and the beamformee 104 explained above is based on the assumption that the index value is equal to the first count. When the index value is equal to the second count, the beamformee 104 can be configured to transmit the feedback matrix having the number of columns equal to the second count. For example, the beamformee 104 can transmit $$\begin{bmatrix} V3_{nTx,nTx} \\ (e^{j(\varphi 1-\varphi 2)} * V3_{nTx,nTx}) \end{bmatrix}_{nLTF,nTx}$$

as the feedback matrix. This reduces a size of the feedback matrix while transmission over the channel 106.

The first matrix including the second and third submatrices can be utilized when the SNR associated with the beamformee 104 is less than a desired value. On the other hand, the first matrix including the fifth and sixth submatrices can be utilized when the quantization noise in the feedback matrix limits a beamforming performance of the beamformer 102.

It will be apparent to a person skilled in the art that the scope of the present disclosure is not limited to the first matrix including the second and third submatrices or the fifth and sixth submatrices. In various other embodiments, the first matrix can include different types of submatrices, without deviating from the scope of the present disclosure.

Figure 3:
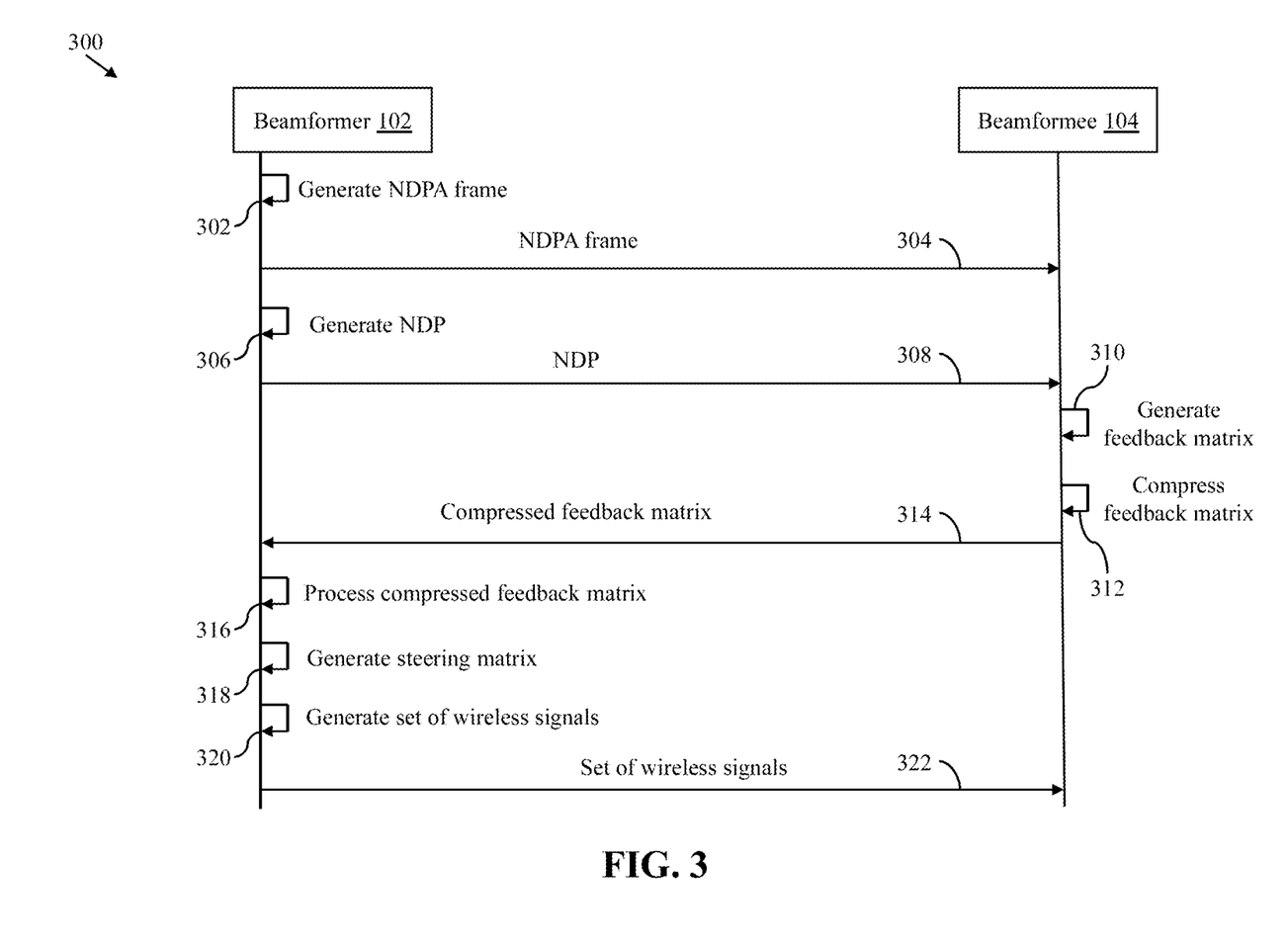
FIG. 3 is a sequence diagram that illustrates beamforming between the beamformer of the wireless network of FIG. 1 and the beamformee of the wireless network of FIG. 1 in accordance with another embodiment of the present disclosure.

FIG. 3 is a sequence diagram 300 that illustrates beamforming between the beamformer 102 and the beamformee 104 in accordance with another embodiment of the present disclosure. The beamformer 102 can generate the NDPA frame (as shown by arrow 302). The beamformer 102 can then transmit the NDPA frame to the beamformee 104 (as shown by arrow 304). The beamformer 102 can generate the NDP (as shown by arrow 306). The beamformer 102 can transmit the NDP to the beamformee 104 (as shown by arrow 308). The generation and transmission of the NDPA frame and the NDP to the beamformee 104 are same as described in FIG. 2.

The beamformee 104 can generate the feedback matrix based on the NDPA frame and the NDP received from the beamformer 102 (as shown by arrow 310). The generation of the feedback matrix is same as described in FIG. 2. The beamformee 104 can then compress the feedback matrix to generate the compressed feedback matrix (as shown by arrow 312). The compression of the feedback matrix results in reduction in a number of rows and columns (i.e., a size) of the feedback matrix. The beamformee 104 can then transmit the compressed feedback matrix to the beamformer 102 (as shown by arrow 314). The beamformer 102 can process the compressed feedback matrix to regenerate the feedback matrix (as shown by arrow 316). The processing of the compressed feedback matrix can include a decompression operation. Based on the feedback matrix, the beamformer 102 can generate the steering matrix associated with the beamformee 104 (as shown by arrow 318). Further, the beamformer 102 can generate the set of wireless signals (as shown by arrow 320). The beamformer 102 can then transmit, based on the steering matrix, the set of wireless signals to the beamformee 104, thereby enabling beamforming between the beamformer 102 and the beamformee 104 (as shown by arrow 322).

Figure 4:
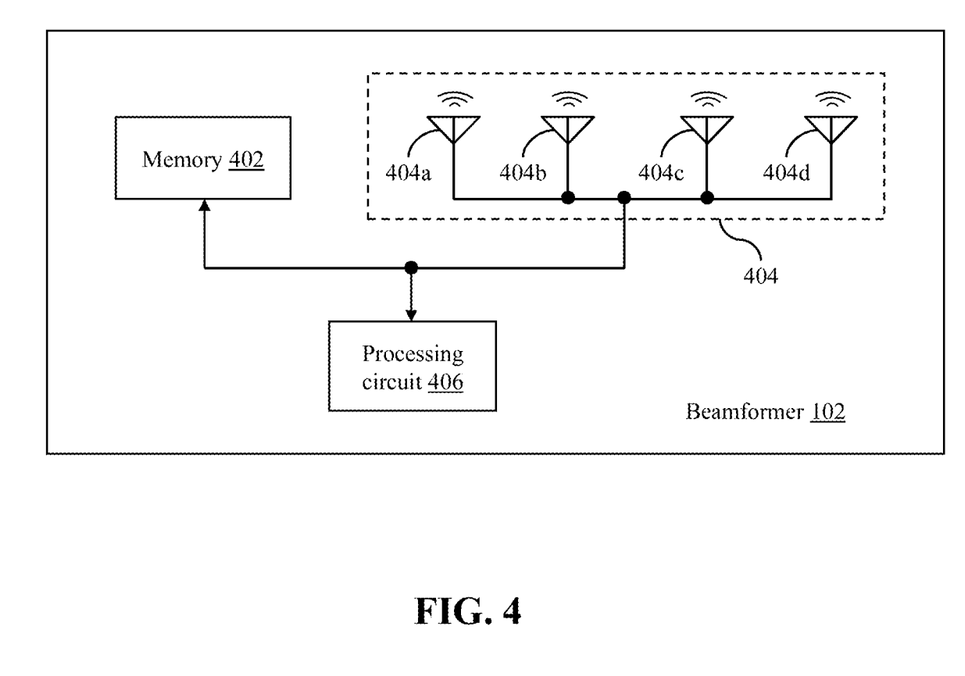
FIG. 4 illustrates a schematic block diagram of the beamformer of the wireless network of FIG. 1 in accordance with an embodiment of the present disclosure.

FIG. 4 illustrates a schematic block diagram of the beamformer 102 in accordance with an embodiment of the present disclosure. The beamformer 102 can include a memory 402, the plurality of antennas (hereinafter referred to and designated as the "plurality of antennas 404"), and a processing circuit 406.

The memory 402 can be configured to store various instructions that when executed by the processing circuit 406 cause the processing circuit 406 to execute operations for enabling beamforming as described in the foregoing description of FIGS. 1-3. The instructions stored in the memory 402 are pursuant to various standards and protocols (e.g., the IEEE 802.11 standard) set forth for wireless communication. Examples of the memory 402 may include a solid-state drive, a random-access memory, a read-only memory, a hard disk drive, a flash memory, a removable storage device, or the like.

The plurality of antennas 404 can be configured to wirelessly communicate with the beamformee 104. In an embodiment, the plurality of antennas 404 can include first through fourth antennas 404a-404d. Each of the first through fourth antennas 404a-404d has various antenna elements. The arrangement of the plurality of antennas 404 (i.e., the antenna elements of the first through fourth antennas 404a-404d) enable beamforming with the beamformee 104.

The processing circuit 406 can be coupled with the memory 402 and the plurality of antennas 404. Further, the processing circuit 406 can be coupled with the beamformee 104 by way of the plurality of antennas 404. The processing circuit 406 can include suitable circuitry that can be configured to execute one or more operations. For example, the processing circuit 406 can be configured to execute the instructions stored in the memory 402 to enable beamforming in the wireless network 100, as explained in conjunction with FIGS. 1-3.

The processing circuit 406 can be configured to generate the NDPA frame, and transmit, using the plurality of antennas 404, the NDPA frame to the beamformee 104. The processing circuit 406 can be further configured to generate the NDP. The processing circuit 406 generates the NDP based on the spatial mapping matrix that is the product of the first and second matrices. Further, the processing circuit 406 can be configured to transmit, using the plurality of antennas 404, the NDP to the beamformee 104 to obtain channel state information associated with the channel 106 and enable beamforming between the beamformer 102 and the beamformee 104. The processing circuit 406 transmits the NDPA frame to the beamformee 104 prior to the transmission of the NDP to the beamformee 104.

In response to the NDP, the processing circuit 406 can be configured to receive, using the plurality of antennas 404, the feedback matrix from the beamformee 104. Alternatively, the processing circuit 406 can be further configured to receive, using the plurality of antennas 404, the compressed feedback matrix from the beamformee 104. In such a scenario, the processing circuit 406 can be further configured to process the compressed feedback matrix to regenerate the feedback matrix.

Based on the feedback matrix, the processing circuit 406 can be further configured to generate the steering matrix associated with the beamformee 104. Further, the processing circuit 406 can be configured to generate the set of wireless signals and transmit, based on the steering matrix, the set of wireless signals to the beamformee 104, thereby enabling beamforming with the beamformee 104. The processing circuit 406 transmits the set of wireless signals to the beamformee 104 using the plurality of antennas 404.

The first matrix can include the second and third submatrices. The second submatrix can correspond to the first identity matrix. The number of rows and the number of columns of the first identity matrix can be equal to the second count. Further, the third submatrix can correspond to the first null matrix. The number of rows of the first null matrix can be equal to the second count, and the number of columns of the first null matrix can be equal to the difference between the first count and the second count. In such a scenario, the steering matrix can correspond to the fourth submatrix of the feedback matrix. The number of rows and the number of columns of the fourth submatrix can be equal to the second count. In other words, the processing circuit 406 can generate the steering matrix by extracting, from the feedback matrix, the fourth submatrix such that the number of rows and the number of columns of the fourth submatrix can be equal to the second count. In an example, the rows and columns of the fourth submatrix can correspond to initial rows and columns of the feedback matrix.

The first matrix can alternatively include the fifth and sixth submatrices. The fifth submatrix can correspond to the product of the first phasor value and the second identity matrix. The number of rows and the number of columns of the second identity matrix can be equal to the second count. Further, the sixth submatrix can correspond to the product of the second phasor value and the third identity matrix. The number of rows and the number of columns of the third identity matrix can be equal to the second count. In such a scenario, to generate the steering matrix, the processing circuit 406 can be further configured to extract the seventh and eighth submatrices from the feedback matrix such that the number of rows and the number of columns of each submatrix of the seventh and eighth submatrices is equal to the second count. In an example, the columns of the seventh and eighth submatrices can correspond to initial columns of the feedback matrix. Further, the processing circuit 406 can be configured to generate the ninth submatrix, and combine the seventh and ninth submatrices to generate the steering matrix.

Figure 5A:
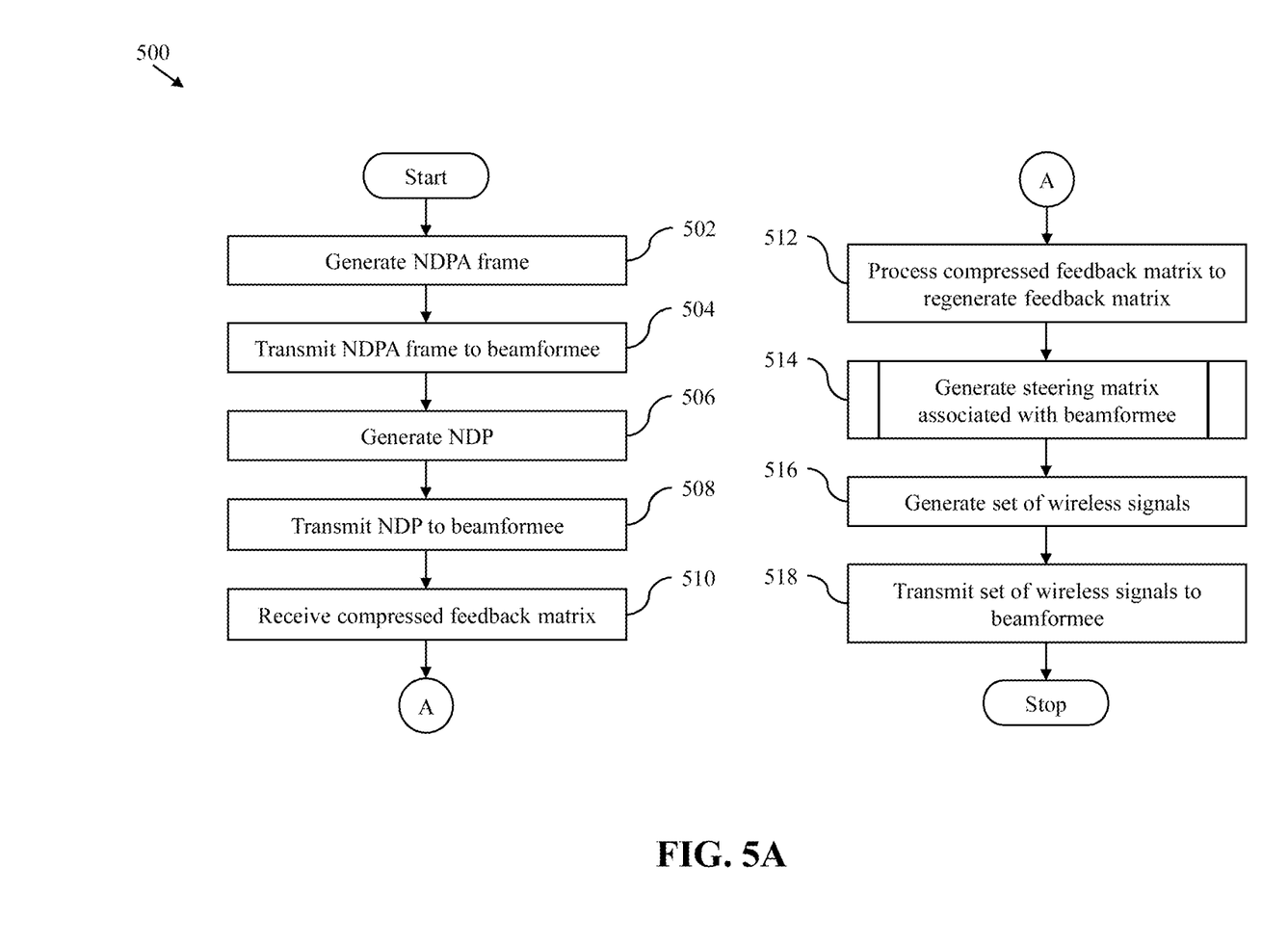
FIGS. 5A and 5B, collectively, represent a flowchart that illustrates a beamforming method in accordance with an embodiment of the present disclosure.
Figure 5B:
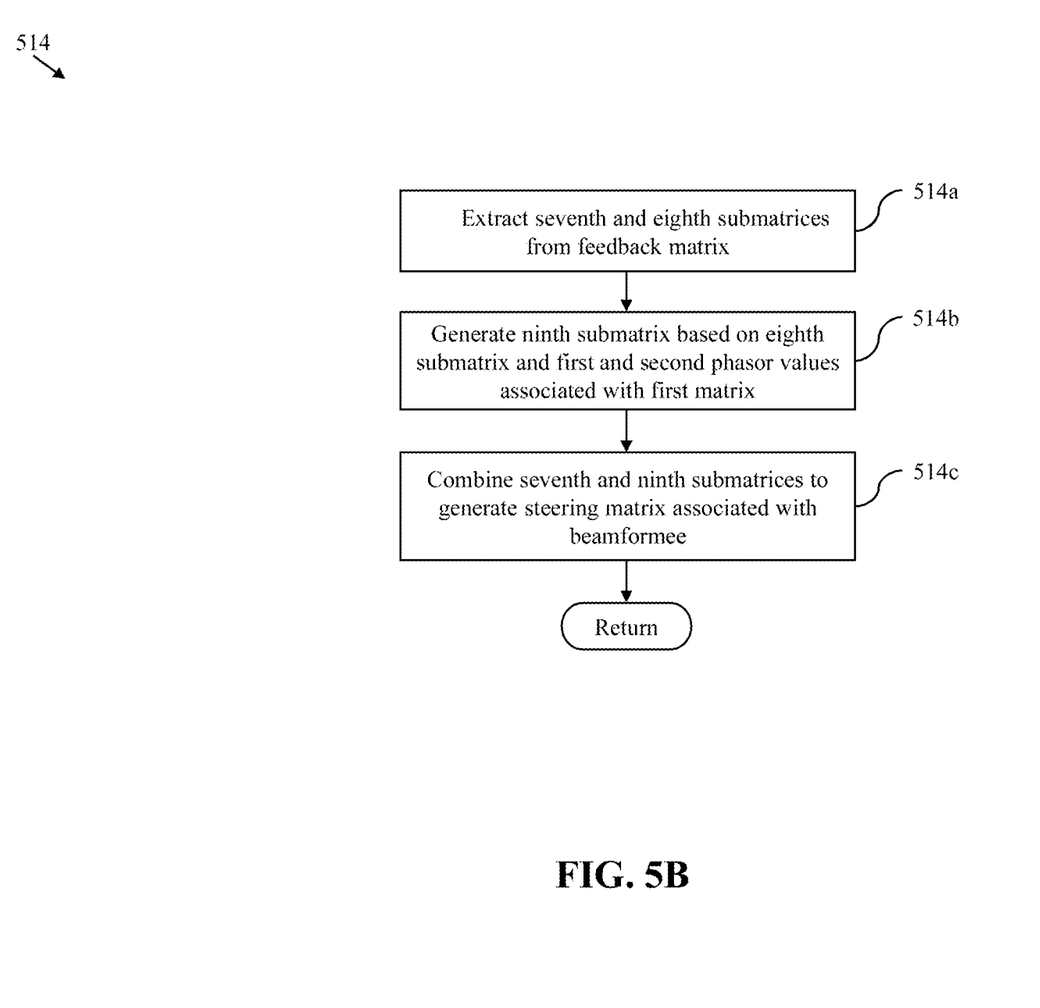

FIGS. 5A and 5B, collectively, represent a flowchart 500 that illustrates a beamforming method in accordance with an embodiment of the present disclosure. The beamforming method can correspond to enabling of beamforming between the beamformer 102 and the beamformee 104 in the wireless network 100.

Referring now to FIG. 5A, at step 502, the beamformer 102 can generate the NDPA frame. At step 504, the beamformer 102 can transmit the NDPA frame to the beamformee 104. At step 506, the beamformer 102 can generate the NDP. The NDP can be generated based on the spatial mapping matrix that is the product of the first and second matrices.

The first matrix has the number of rows equal to the second count, and the number of columns equal to the first count. The first matrix corresponds to the first submatrix of the first orthogonal matrix. The first orthogonal matrix can have the number of rows and the number of columns equal to the first count. Further, the number of rows and the number of columns of the second matrix can be equal to the first count. The second matrix corresponds to the second orthogonal matrix. For the sake of ongoing discussion, it is assumed that the first matrix includes the fifth and sixth submatrices. The fifth submatrix is the product of the first phasor value and the second identity matrix. Further, the sixth submatrix is the product of the second phasor value and the third identity matrix.

At step 508, the beamformer 102 can transmit the NDP to the beamformee 104. Based on the NDPA frame and the NDP, the beamformee 104 can generate the feedback matrix and compress the generated feedback matrix. The feedback matrix can be indicative of the channel state information associated with the channel 106.

At step 510, the beamformer 102 can receive the compressed feedback matrix from the beamformee 104. At step 512, the beamformer 102 can process the compressed feedback matrix to regenerate the feedback matrix. At step 514, the beamformer 102 can generate the steering matrix associated with the beamformee 104 based on the feedback matrix.

Referring now to FIG. 5B, at step 514a, the beamformer 102 can extract the seventh and eighth submatrices from the feedback matrix. At step 514b, the beamformer 102 can generate the ninth submatrix based on the eighth submatrix and the first and second phasor values associated with the first matrix. At step 514c, the beamformer 102 can combine the seventh and ninth submatrices to generate the steering matrix associated with the beamformee 104.

Referring back to FIG. 5A, at step 516, the beamformer 102 can generate the set of wireless signals. At step 518, the beamformer 102 can transmit, based on the steering matrix, the set of wireless signals to the beamformee 104, thereby enabling beamforming between the beamformer 102 and the beamformee 104.

When the first matrix includes the second and third submatrices, beamforming between the beamformer 102 and the beamformee 104 can be enabled in a similar manner as described above except that the steering matrix can be generated by extracting the fourth submatrix from the feedback matrix. The fourth submatrix has the number of rows and the number of columns equal to the second count.

It will be apparent to a person skilled in the art that the scope of the present disclosure is not limited to the beamformee 104 compressing the feedback matrix prior to transmission to the beamformer 102. In an alternate embodiment, the beamformer 102 can receive the feedback matrix from the beamformee 104 as opposed to the compressed feedback matrix. In such a scenario, beamforming between the beamformer 102 and the beamformee 104 can be enabled in a similar manner as described above sans the step 512 (i.e., sans the regeneration of the feedback matrix).

Thus, the beamformer 102 of the present disclosure generates the NDP having the number of LTFs greater than the number of antennas thereof and the number of spatial time streams equal to the number of LTFs. The NDP is generated based on the spatial mapping matrix having the number of rows equal to the number of antennas of the beamformer 102 and the number of columns equal to the number of LTFs. Further, the beamformee 104 generates the feedback matrix based on the LTFs and the spatial time streams associated with the beamformer 102. Hence, in a beamforming technique of the present disclosure, a need to transmit a separate status bit to the beamformee 104 to indicate that the number of LTFs in the NDP is greater than the number of antennas of the beamformer 102, is eliminated. Further, the LTFs and the spatial time streams are a part of the IEEE 802.11 standard. As a result, the beamforming technique of the present disclosure can be implemented for the IEEE 802.11 standard. The beamforming technique of the present disclosure thus has a greater utility than a conventional beamforming technique which requires a separate status bit to be transmitted to a beamformee, and hence, cannot be implemented for the IEEE 802.11 standard.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims. Further, unless stated otherwise, terms such as "first" and "second" are used to arbitrarily distinguish between the elements such terms describe. Thus, these terms are not necessarily intended to indicate temporal or other prioritization of such elements.

What is claimed is:

1. A beamformer, comprising: a plurality of antennas; and a processing circuit that is coupled with the plurality of antennas, and configured to:
    generate a null data packet (NDP) that comprises a plurality of long training fields (LTFs), wherein a first count of the plurality of LTFs is greater than a second count of the plurality of antennas, wherein the NDP is generated based on a spatial mapping matrix that is a product of first and second matrices, and wherein the first matrix has a number of rows equal to the second count and a number of columns equal to the first count, and the second matrix has a number of rows and a number of columns equal to the first count; and
    transmit, using the plurality of antennas, the NDP to a beamformee to enable beamforming between the beamformer and the beamformee; wherein the processing circuit is further configured to:
    generate a steering matrix associated with the beamformee based on a feedback matrix, wherein the feedback matrix is generated by the beamformee based on the NDP, and is indicative of channel state information associated with a channel between the beamformer and the beamformee; and
    transmit, based on the steering matrix and using the plurality of antennas, a set of wireless signals to the beamformee, thereby enabling beamforming between the beamformer and the beamformee.

2. The beamformer of claim 1, wherein the first matrix corresponds to a first submatrix of a first orthogonal matrix, wherein the first orthogonal matrix has a number of rows and a number of columns equal to the first count, and wherein the second matrix corresponds to a second orthogonal matrix.

3. The beamformer of claim 1, wherein the NDP further comprises a signal field that is indicative of a number of spatial time streams associated with the beamformer, and wherein the number of spatial time streams is equal to the first count.

4. The beamformer of claim 1, wherein the processing circuit is further configured to receive, using the plurality of antennas, a compressed feedback matrix from the beamformee, and process the compressed feedback matrix to regenerate the feedback matrix.

5. The beamformer of claim 1, wherein the processing circuit is further configured to receive, using the plurality of antennas, the feedback matrix from the beamformee.

6. The beamformer of claim 1, wherein the processing circuit is further configured to:
generate an NDP announcement (NDPA) frame, wherein the NDPA frame comprises an index value that is indicative of a number of columns to be included in the feedback matrix, and is equal to one of the first and second counts; and
transmit the NDPA frame to the beamformee using the plurality of antennas, wherein the processing circuit transmits the NDPA frame to the beamformee prior to the transmission of the NDP to the beamformee.

7. The beamformer of claim 1, wherein the first matrix comprises second and third submatrices that correspond to a first identity matrix and a null matrix, respectively, wherein the first identity matrix has a number of rows and a number of columns equal to the second count, and wherein the null matrix has a number of rows equal to the second count, and a number of columns equal to a difference between the first and second counts.

8. The beamformer of claim 7, wherein the steering matrix corresponds to a fourth submatrix of the feedback matrix, and wherein the fourth submatrix has a number of rows and a number of columns equal to the second count.

9. The beamformer of claim 1, wherein the first matrix comprises a fifth submatrix that corresponds to a product of a first phasor value and a second identity matrix, wherein the second identity matrix has a number of rows and a number of columns equal to the second count, wherein the first matrix further comprises a sixth submatrix that corresponds to a product of a second phasor value and a third identity matrix, and wherein the third identity matrix has a number of rows and a number of columns equal to the second count.

10. The beamformer of claim 9, wherein to generate the steering matrix, the processing circuit is further configured to:
extract seventh and eighth submatrices from the feedback matrix such that a number of rows and a number of columns of each submatrix of the seventh and eighth submatrices is equal to the second count;
generate a ninth submatrix based on the eighth submatrix and the first and second phasor values; and
combine the seventh and ninth submatrices to generate the steering matrix.

11. A beamforming method, comprising:
generating, by a beamformer, a null data packet (NDP) that comprises a plurality of long training fields (LTFs), wherein a first count of the plurality of LTFs is greater than a second count of a plurality of antennas of the beamformer, wherein the NDP is generated based on a spatial mapping matrix that is a product of first and second matrices, and wherein the first matrix has a number of rows equal to the second count, and a number of columns equal to the first count, and the second matrix has a number of rows and a number of columns equal to the first count; and
transmitting, by the beamformer, using the plurality of antennas, the NDP to a beamformee to enable beamforming therebetween;
generating, by the beamformer, a steering matrix associated with the beamformee based on a feedback matrix, wherein the feedback matrix is generated by the beamformee based on the NDP, and is indicative of channel state information associated with a channel between the beamformer and the beamformee; and
transmitting, by the beamformer, based on the steering matrix and using the plurality of antennas, a set of wireless signals to the beamformee, thereby enabling beamforming therebetween.

12. The beamforming method of claim 11, wherein the first matrix corresponds to a first submatrix of a first orthogonal matrix, wherein the first orthogonal matrix has a number of rows and a number of columns equal to the first count, and wherein the second matrix corresponds to a second orthogonal matrix.

13. The beamforming method of claim 11, wherein the NDP further comprises a signal field that is indicative of a number of spatial time streams associated with the beamformer, and wherein the number of spatial time streams is equal to the first count.

14. The beamforming method of claim 11, further comprising:
receiving, by the beamformer, using the plurality of antennas, a compressed feedback matrix from the beamformee; and
processing, by the beamformer, the compressed feedback matrix to regenerate the feedback matrix.

15. The beamforming method of claim 11, further comprising:
generating, by the beamformer, an NDP announcement (NDPA) frame, wherein the NDPA frame comprises an index value that is indicative of a number of columns to be included in the feedback matrix, and is equal to one of the first and second counts; and
transmitting, by the beamformer, using the plurality of antennas, the NDPA frame to the beamformee, wherein the NDPA frame is transmitted to the beamformee prior to the transmission of the NDP to the beamformee.

16. The beamforming method of claim 11, wherein the first matrix comprises second and third submatrices that correspond to a first identity matrix and a null matrix, respectively, wherein the first identity matrix has a number of rows and a number of columns equal to the second count, wherein the null matrix has a number of rows equal to the second count, and a number of columns equal to a difference between the first and second counts, and wherein the steering matrix corresponds to a fourth submatrix of the feedback matrix such that the fourth submatrix has a number of rows and a number of columns equal to the second count.

17. The beamforming method of claim 11, wherein the first matrix comprises a fifth submatrix that corresponds to a product of a first phasor value and a second identity matrix, wherein the second identity matrix has a number of rows and a number of columns equal to the second count, wherein the first matrix further comprises a sixth submatrix that corresponds to a product of a second phasor value and a third identity matrix, and wherein the third identity matrix has a number of rows and a number of columns equal to the second count.

18. The beamforming method of claim 17, wherein the step of generating the steering matrix further comprises:
- extracting, by the beamformer, seventh and eighth submatrices from the feedback matrix such that a number of rows and a number of columns of each submatrix of the seventh and eighth submatrices is equal to the second count;
- generating, by the beamformer, a ninth submatrix based on the eighth submatrix and the first and second phasor values; and
- combining, by the beamformer, the seventh and ninth submatrices to generate the steering matrix.

* * * * *